F. W. SCHANDONEY & W. J. HALL.
SPROCKET WHEEL.
APPLICATION FILED MAR. 2, 1909.

946,582.

Patented Jan. 18, 1910.
2 SHEETS—SHEET 1.

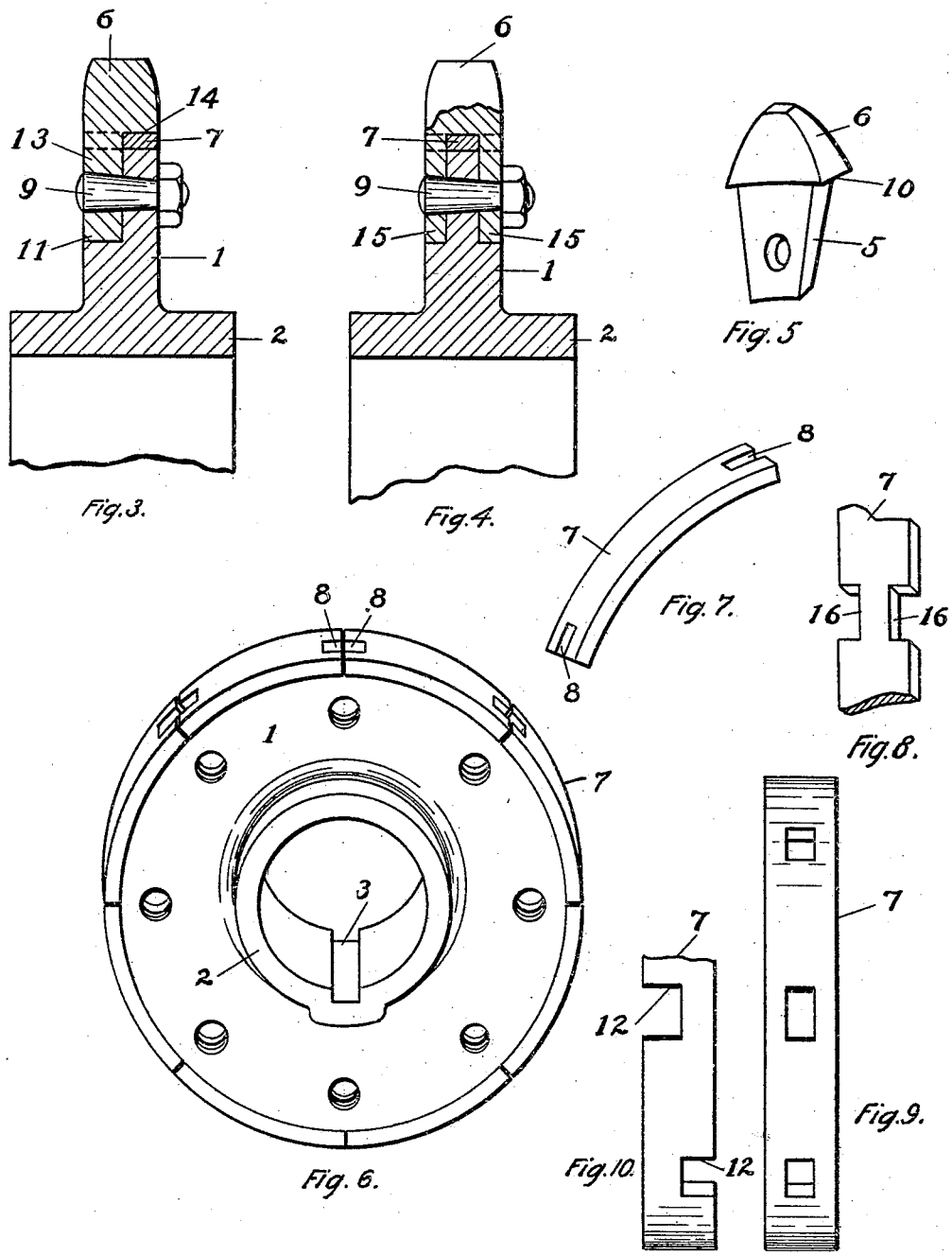

UNITED STATES PATENT OFFICE.

FRED W. SCHANDONEY AND WILLIAM J. HALL, OF LIND, WASHINGTON.

SPROCKET-WHEEL.

946,582. Specification of Letters Patent. Patented Jan. 18, 1910.

Application filed March 2, 1909. Serial No. 480,881.

*To all whom it may concern:*

Be it known that we, FRED W. SCHANDONEY and WILLIAM J. HALL, citizens of the United States, residing at Lind, in the county of Adams and State of Washington, have invented certain new and useful Improvements in Sprocket-Wheels, of which the following is a specification.

In a sprocket wheel the only parts subject to wear are the teeth and the rim, in view of which it is desirable to make such parts detachable in order that they may be removed when worn, and replaced by new parts.

The present invention has for its object to provide a sprocket wheel in which the rim and teeth are detachable for the purpose stated, novel and improved means being employed for connecting said parts to the body of the wheel, as will be hereinafter described and claimed.

The invention is illustrated in the accompanying drawings in which—

Figure 1:
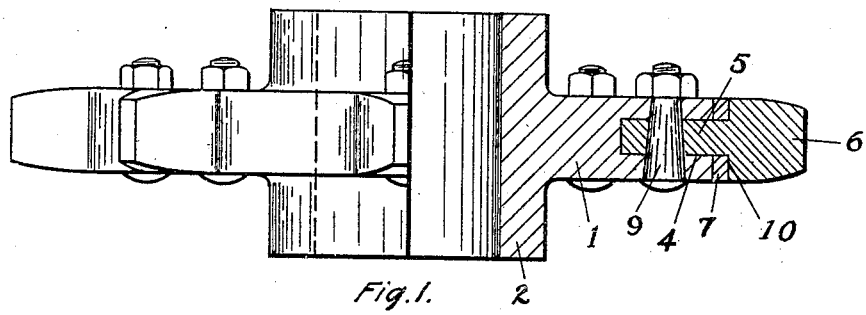
Figure 2:
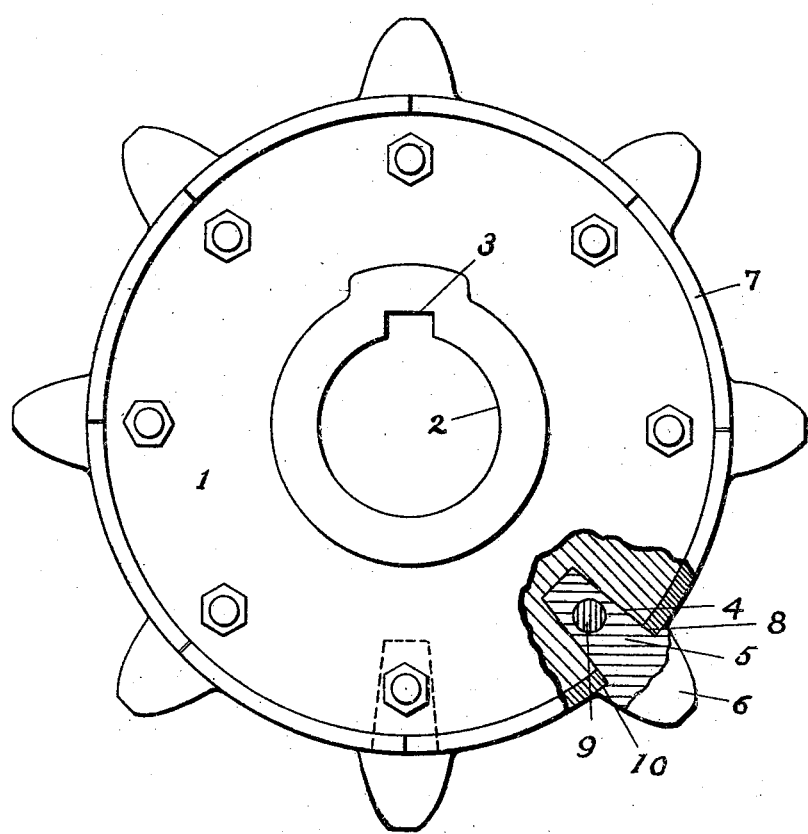

Figure 1 is an edge view of the wheel, partly in section. Fig. 2 is a face view, partly broken away. Fig. 3 is a section showing a modified form of tooth fastening. Fig. 4 is a view similar to the preceding showing another form of tooth fastening. Fig. 5 is a perspective view of the form of tooth employed in the structure shown in Figs. 1 and 2. Fig. 6 is a perspective view of the body and rim of the wheel shown in Figs. 1 and 2. Fig. 7 is a perspective view of one of the rim sections. Fig. 8 is a perspective view of a fragment of a modified form of rim. Figs. 9 and 10 are edge views of further modified forms of rims.

Referring to the drawings, 1 denotes the body of the wheel, the same being in the shape of a disk, and provided with a hub 2. A keyway 3 is made in the hub which receives the usual key for fastening the wheel to the shaft, or other part. In the periphery of the disk, midway between the faces thereof, are inwardly tapering radial sockets 4, which receive the shanks 5 of the detachable teeth 6, said shanks being also made tapering or wedge shaped, so that they may be driven tightly into the sockets. The sockets are spaced apart uniformly, and they correspond in number to the number of teeth with which the wheel is provided.

The rim of the wheel shown in Figs. 1, 2 and 6 is composed of a plurality of arcuate strips 7 which are so dimensioned that when fitted to the periphery of the disk 1, they form a ring which completely and snugly encircles the same. The strips are of the same width as the disk, and they are of such length that the joints between the strips are over the sockets 4. The meeting ends of the strips are recessed as indicated at 8, and the recesses of adjoining strips are in alinement as clearly shown in Fig. 6. The alined recesses register with the sockets, and the shanks of the teeth pass therethrough.

Instead of making the rim in sections, it may be in one piece as shown in Fig. 9.

The teeth are fastened in the sockets by wedge bolts 9 passing transversely through openings in the disk and in the shanks of the teeth, said openings registering when the teeth are in place. If desired some other form of bolt may be employed.

The rim and the teeth will be made of some metal having a smaller coefficient of friction than cast iron which is usually employed in the construction of the wheel body, and also in wheels having integral teeth and rims, thus causing less wear on the chain.

By the structure herein described the teeth and the rim are rigidly secured to the wheel body, and at the same time they can be easily removed when worn. The parts are few and simple, and the wheel can therefore be cheaply manufactured.

The body of the tooth is wider and thicker than the shank, whereby a shoulder 10 is formed at the sides and ends of the tooth base, which shoulder engages the outer surface of the rim, as shown in Figs. 1 and 2 whereby the rim is clamped to the disk, and thus securely fastened in place. No additional fastening means are necessary, and the structure is therefore greatly simplified, the fastening means of the teeth also serving to fasten the rim.

In the modification shown in Fig. 3, the disk 1 has recesses 11 in its faces, said recesses being preferably arranged in alternate order, and opening into the periphery of the disk. The rim employed is preferably in one piece, and has notches 12 in its edges corresponding to the recesses 11 when in place. This form of ring is shown in Fig. 10. The tooth employed has a shank 13 which fits in the notch and recess, the shank being located to one side of the tooth, whereby a shoulder 14 is had at the base of the tooth, which shoulder engages the outer surface of the rim, and serves the same purpose as the shoulder 10. The tooth is fastened by a wedge bolt in the same manner as the tooth already described.

In the modification shown in Fig. 4, the shank of the tooth is slotted, the two branches 15 thus formed straddling the disk which is recessed to receive said branches. As in the structures already described, the rim fits between the base of the tooth and the periphery of the disk, and in the present instance has notches 16 in its edges through which the shank branches pass into the recesses of the disk. A wedge bolt as before is employed for fastening the tooth in place.

We claim—

1. A sprocket wheel having a detachable rim and separate and detachable teeth.

2. A sprocket wheel comprising a disk having sockets in its periphery, teeth detachably secured in said sockets, and provided with shoulders, and a detachable rim held between the periphery of the disk and the shoulders of the teeth.

3. A sprocket wheel comprising a disk having sockets in its periphery, a detachable rim fitting said periphery, and having openings registering with the sockets, teeth provided with shanks extending through the openings, and into the sockets, and having shoulders engaging the rim, and means for detachably securing the teeth.

4. A sprocket wheel comprising a disk, a detachable rim fitting the periphery of the disk, and teeth detachably fastened to the disk, and having means for clamping the rim between the periphery of the disk and the teeth.

5. A sprocket wheel comprising a disk having sockets in its periphery, a detachable sectional rim fitting said periphery, and having openings registering with the sockets, sprocket teeth having shanks extending through said openings and into the sockets, and having shoulders engaging the outer surface of the rim sections and means for detachably fastening the shanks in the sockets.

6. A sprocket wheel comprising a disk having sockets in its periphery, a detachable sectional rim fitting said periphery, the meeting ends of the sections having recesses, and the recesses of adjoining sections registering with the sockets, and teeth provided with shanks extending through said recesses into the sockets, and detachably fastened therein, the teeth having means for clamping the rim sections between said teeth and the periphery of the disk.

In testimony whereof we affix our signatures in presence of two witnesses.

FRED W. SCHANDONEY.
WILLIAM J. HALL.

Witnesses:
D. R. MORGAN,
R. J. GORDON.